United States Patent [19]

Takeuchi

[11] Patent Number: 5,822,019
[45] Date of Patent: Oct. 13, 1998

[54] VIDEO SIGNAL TRANSMITTING APPARATUS WITH ATTENDANT DATA INSERTION AND EXTRACTION FUNCTIONS

[75] Inventor: Hajime Takeuchi, Kanagawa, Japan

[73] Assignee: Sony Corporation, Tokyo, Japan

[21] Appl. No.: 750,859

[22] PCT Filed: May 8, 1996

[86] PCT No.: PCT/JP96/01213

§ 371 Date: Mar. 3, 1997

§ 102(e) Date: Mar. 3, 1997

[87] PCT Pub. No.: WO96/36177

PCT Pub. Date: Nov. 14, 1996

[30] Foreign Application Priority Data

May 9, 1995 [JP] Japan .................................. 7-136177

[51] Int. Cl.⁶ .................................................. H04N 7/08
[52] U.S. Cl. .......................................... 348/722; 348/478
[58] Field of Search ................................... 348/722, 478, 348/584, 232, 236, 705, 564, 589, 598

[56] References Cited

U.S. PATENT DOCUMENTS

| 5,115,310 | 5/1992 | Takano et al. | 348/722 |
| 5,335,072 | 8/1994 | Tanaka et al. | 348/232 |
| 5,541,663 | 7/1996 | Ohno | 348/428 |
| 5,568,205 | 10/1996 | Hurwitz | 348/722 |

*Primary Examiner*—Victor Kostak
*Attorney, Agent, or Firm*—Jay H. Maioli

[57] ABSTRACT

In a video signal transmitting apparatus which edits video data by a plurality of editing units, after the video data made in a shooting unit is stored in a video data storing unit, attendant information is added in making the video data, and the attendant information is extracted to be used as a keyword in a database in the video data storing unit, thereby editing the video data. Therefore, construction of a database and editing of video data can be performed easily and correctly.

4 Claims, 9 Drawing Sheets

| | |
|---|---|
| 0~1 | SYNCHRONIZING BITS |
| 2~5 | THE FIRST DIGIT OF FRAME |
| 6~9 | USER'S BITS 1 |
| 10~11 | SYNCHRONIZING BITS |
| 12~13 | THE SECOND DIGIT OF FRAME |
| 14 | DISPLAY OF DROP FRAME |
| 15 | RESERVED AS COLOR FRAME ID |
| 16~19 | USER'S BITS 2 |
| 20~21 | SYNCHRONIZING BITS |
| 22~25 | THE FIRST DIGIT OF SECOND |
| 26~29 | USER'S BITS 3 |
| 30~31 | SYNCHRONIZING BITS |
| 32~34 | THE SECOND DIGIT OF SECOND |
| 35 | FIELD MARKS ("0"…1ST, 3RD FIELDS / "1"…2ND, 4TH FIELDS) |
| 36~39 | USER'S BITS 4 |
| 40~41 | SYNCHRONIZING BITS |

| | |
|---|---|
| 42~45 | THE FIRST DIGIT OF MINUTE |
| 46~49 | USER'S BITS 5 |
| 50~51 | SYNCHRONIZING BITS |
| 52~54 | THE SECOND DIGIT OF MINUTE |
| 55 | "0" ZERO |
| 56~59 | USER'S BITS 6 |
| 60~61 | SYNCHRONIZING BITS |
| 62~65 | THE FIRST DIGIT OF HOUR |
| 66~69 | USER'S BITS 7 |
| 70~71 | SYNCHRONIZING BITS |
| 72~73 | THE SECOND DIGIT OF HOUR |
| 74~75 | "0" ZERO |
| 76~79 | USER'S BITS 8 |
| 80~81 | SYNCHRONIZING BITS |
| 82~89 | CRC CODE (CYCLIC REDUNDANCY CHECK CODE) |

FIG. 5(B)

VIDEO SIGNAL TRANSMITTING APPARATUS WITH ATTENDANT DATA INSERTION AND EXTRACTION FUNCTIONS

TECHNICAL FIELD

This invention relates to a video signal transmitting apparatus, and more particularly, is suitable for use in a broadcasting system used in a broadcasting station.

BACKGROUND ART

Heretofore, this type of broadcasting system adopts a method that information such as title, shooting time and date, cameraman, and shooting scene (hereinafter, referred to as attendant information) are added to news materials to manage a shot video when a video signal of news materials is transmitted from the shooting scene to a broadcasting station, so as to make an edition of news television programs easier.

More specifically, in a broadcasting system shown in FIG. 1, a video signal obtained by shooting a video at a shooting scene by a shooting unit 2 containing a television camera, etc. is transmitted from an out-side broadcast van 3 to a broadcasting station STN via a transmission line 4 which is a satellite circuit or a ground circuit.

A receiving unit 5 of the broadcasting station STN stores the transmitted video signal for each news material in a recording medium in a video signal storing unit 6 having a large capacity which is, for example, a cassette changer. The video signal of each news material stored in the video signal storing unit 6 is selectively picked up in accordance with editing operator's demands from a plurality of editing units 7A to 7N and edited as news television programs for on air.

Here, the editing operators of respective editing units 7A to 7N edit while the operators refer to the attendant information as keyword information representing the contents of news materials.

Also, in the case where the video signal of news materials is recorded in a recording medium 8 which is a video tape or the like and delivered directly to the broadcasting station, the recording medium 8 in which the video signal made in the shooting unit 2 is recorded is put in the video signal storing unit 6 as it is.

The attendant information is added to the video signal for each news material and transmitted to the broadcasting station STN as described above, so that the editing operators can edit at the broadcasting station while confirming "When the video is shot", "Where the video is shot", "Who shot the video", and "What is the video", by using the attendant information as a keyword.

In the aforesaid structure of a broadcasting system 1, it can be considered that the attendant information is superimposed on the video signal as a method of adding the attendant information to the video signal. However, in the use of such a method, as shown in FIG. 2, the attendant information AR1 appears on a screen, thereby it can not be used as a video for broadcasting. Therefore, a method is practically used that the attendant information is superimposed only to the head of the video when the object to be covered is shot by the shooting unit 2, or that the attendant information is formed by voice instead of the superimposing to the video.

Further, a method is used in which the circuit different from a circuit for transmitting the video signal is set up to transmit the attendant information, the attendant information is printed with bar-code to a label, etc., and the label is affixed to the recording medium 8. In this method, a signal memory unit only for the attendant information is provided separately from the video signal storing unit. The correspondence between the attendant information stored in the signal memory unit and the video signal stored in the video signal storing unit (the correspondence being which portion of the video signal storing unit the video signal corresponding to the attendant information is stored in allows the absolute address number in which the video signal is stored to be generally added to the attendant information) is performed in accordance with the decision of operators.

The video signal to be transmitted in which the attendant information is added in the above way is displayed on a monitor (not shown) with the portion in which the attendant information is added, by the editing operators in the editing units 7A to 7N. Then, it is confirmed whether or not the video signal is a desired video signal.

However, in the case of superimposing the attendant information to the head of the shot video, there is a problem that the contents of the video can not be confirmed if the editing operators do not watch the head of the video for each news material. In the method of providing a different circuit, there is also a problem that it takes time to provide a circuit so that it is difficult to deal with in an urgency. Further, in the case of delivering the recording medium 8 from a distant place, there is a problem that it takes time to deliver the recording medium 8.

Furthermore, in the method of providing a different circuit or adding the attendant information with a label in the recording medium, there is a problem that since the attendant information is separated from the video signal, the attendant information does not correspond with the video signal due to carelessness in the operation of the recording medium.

DISCLOSURE OF INVENTION

The object of this invention is to solve the above problems and to provide a video signal transmitting apparatus which can easily and surely process the contents of video when the video of news materials are handled, for example, when the news materials are stored or when the video is edited in the editing units.

In order to solve the above problems, this invention provides a video signal transmitting apparatus comprising: a video data transmitting part for adding attendant information to video data generated by a shooting unit in a different time area from the video data to compose transmission video data and outputting the transmission video data; a video data storing part for receiving and storing the transmission video data; a database storing part for extracting the attendant information which has been added to the transmission video data and using the extracted attendant information as a keyword to store in a database; and editing units for editing the transmission video data stored in the video data storing part based on a keyword stored in the database storing part.

The video data, to which the attendant information is added, generated in the video data transmitting part uses the attendant information as a keyword and is recorded in a database in the database storing unit. The video data stored with a keyword respectively in the database storing unit is taken out by editing units to be edited. The use of the added attendant information makes it possible to record the video data in a database and to edit easily and surely.

Further, the video signal transmitting apparatus according to this invention comprises: a video data transmitting part for forming transmission blocks in one field unit or one frame unit to generate transmission video data; and a video data receiving part for receiving the transmission video data generated at the video data transmitting part and reproducing the video signal. The video data transmitting part includes attendant information inserting means for inserting the attendant information representing the contents of the video signal in the blanking interval in the transmission block.

The attendant information is inserted in the blanking interval in the transmission block of the transmission video data generated for each field or frame, so as to add the attendant information to the video data without preventing a video from being looked at and listened to.

Further, the attendant information is extracted from the transmission video data to display it, so that the contents of the video can be confirmed from the attendant information displayed separately from a part of the video signal.

Further, the transmission video data is reproduced to extract only the attendant information from the transmission video data recorded with the attendant information, and the extracted attendant information is displayed. Therefore, the recorded video data can be retrieved and reused.

In this way, according to this invention, the attendant information representing the management contents of video data is inserted in the video data having television signal format, by utilizing user bits of the television signal format, so as to realize the video signal transmitting apparatus which can easily and surely store and use the video data, such as a database construction of video data.

BRIEF DESCRIPTION OF DRAWINGS

FIG. 5(B) is a table showing the contents of information assigned to respective bits of FIG. 5(A);

BEST MODE FOR CARRYING OUT THE INVENTION

Figure 1:
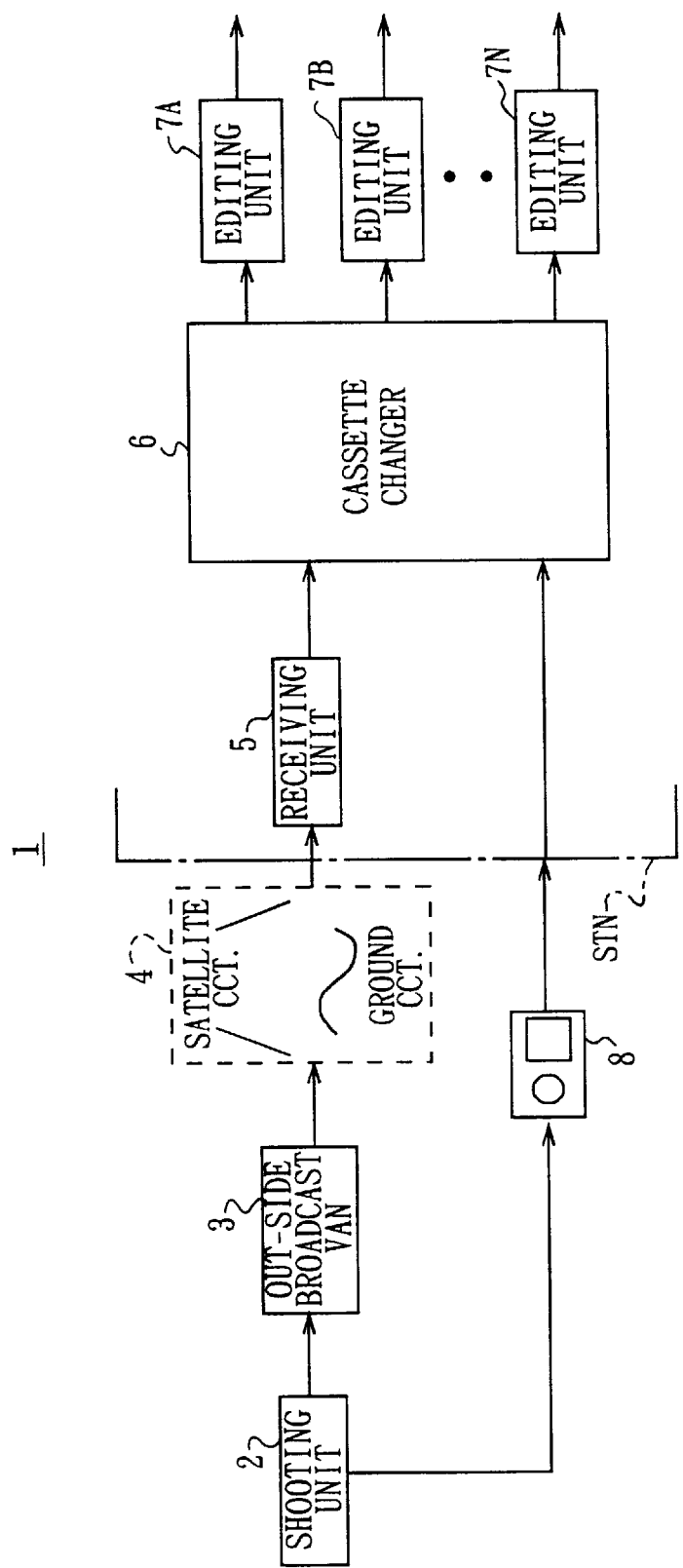
FIG. 1 is a block diagram showing a conventional broadcasting system.
Figure 2:
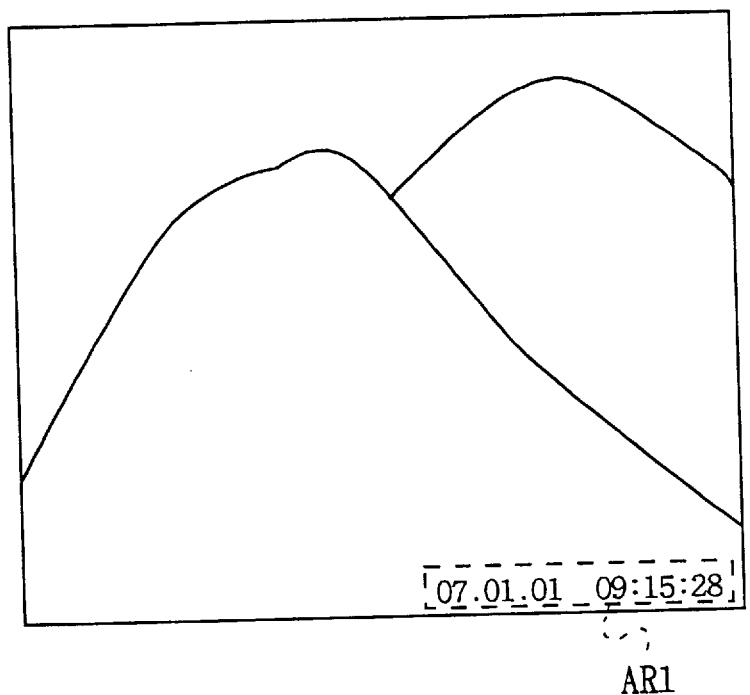
FIG. 2 is a schematic diagram explaining a method of adding attendant information.

Referring to the drawings, one embodiment of this invention will be hereinafter described in detail.

(1) Structure of Video Signal Transmitting Apparatus

Figure 3:
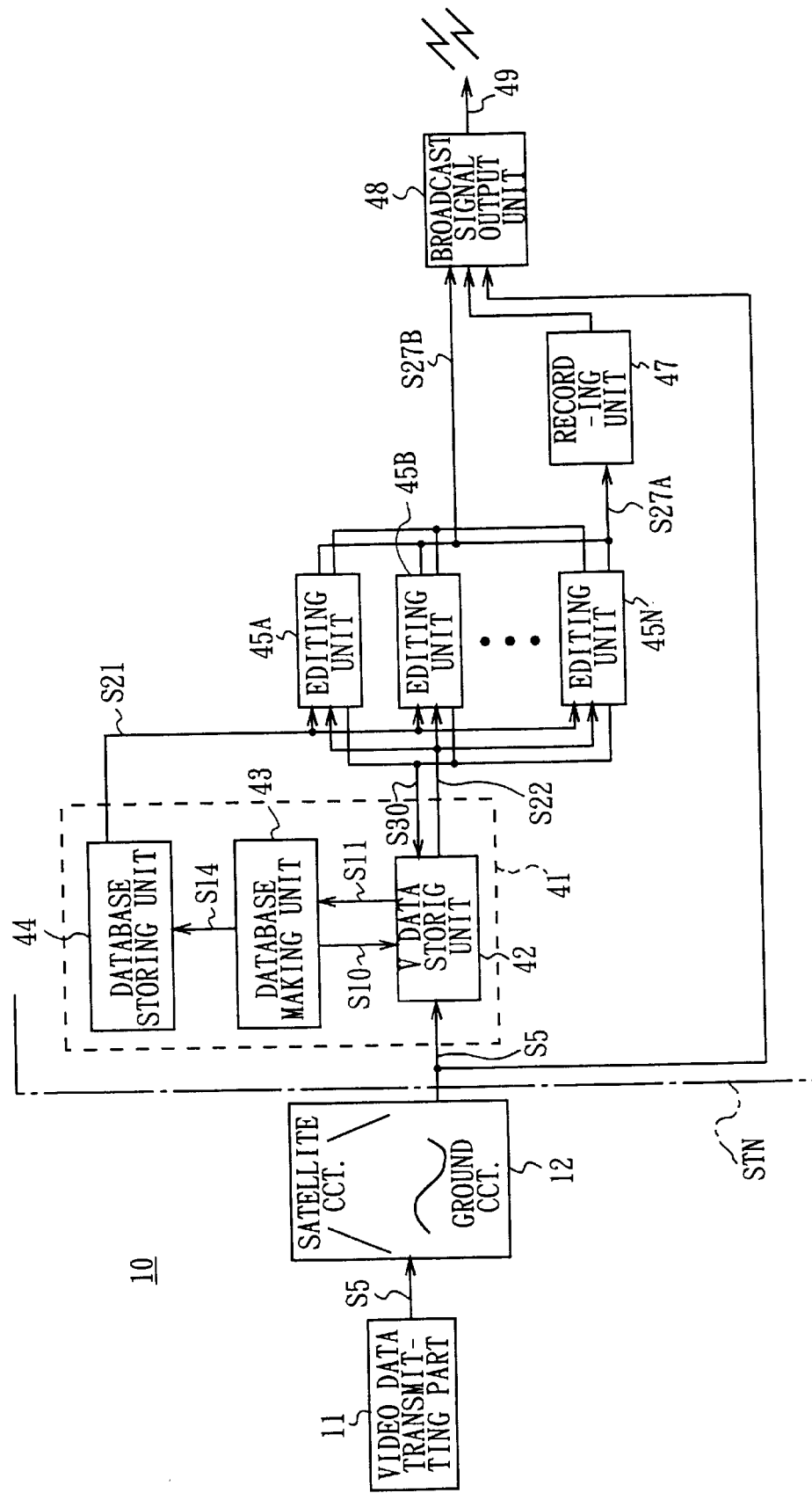
FIG. 3 is a block diagram showing one embodiment of the video signal transmitting apparatus according to this invention.

In FIG. 3, 10 shows a broadcasting system which is an embodiment of the video signal transmitting apparatus as a whole. The video signal of news materials generated in a video data transmitting part 11 at a shooting scene, which is inserted with the attendant information in a part of the signal format, is transmitted as transmission video data S5 to a broadcasting station STN via a transmission line 12 using a satellite circuit or a ground circuit. The attendant information is extracted from the transmission video data S5 received at the broadcasting station STN to use in a signal processing as the occasion demands.

Figure 4:
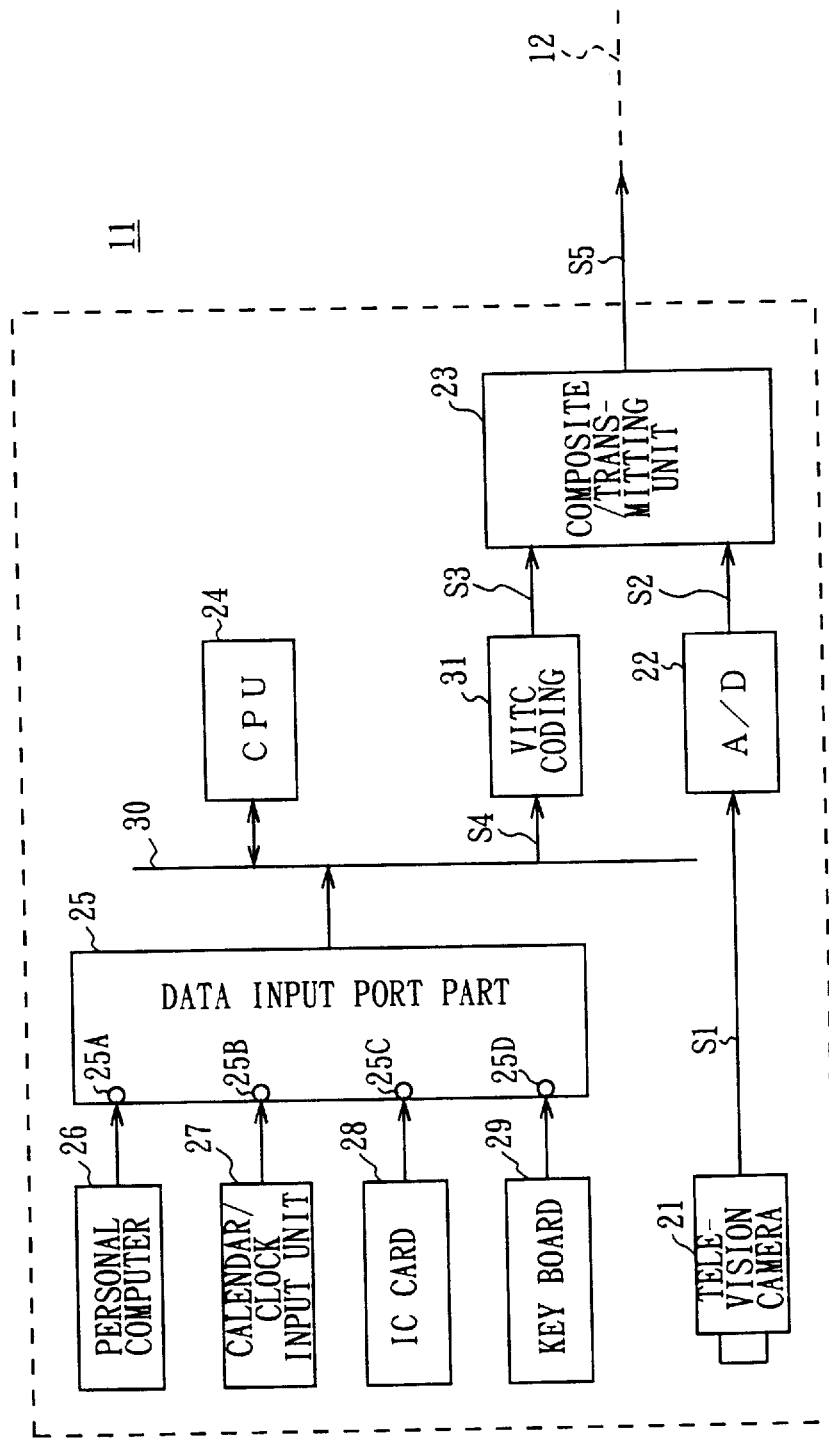
FIG. 4 is a block diagram showing the detailed structure of the video data transmitting part of FIG. 3.

In the video data transmitting part 11, as shown in FIG. 4, the video to be covered is shot by a television camera 21 being a shooting unit, so that video signal S1 of a specific format, e.g., NTSC television system based upon the electric industries association (EIA) standard RS170-A "Color Television Studio Picture Line Amplifier Output" is obtained and converted at an analog-to-digital converting circuit 22 into material video data S2 based upon the interface for transmission of composite digital video data of the society of motion picture and television engineering (SMPTE) standard 259M, thereafter, supplied to a composite/transmitting unit 23.

For the video shot by the television camera 21, the attendant information including "title", "shooting date and time", "cameraman", and "shooting scene" is specified as the attendant information representing the management contents of news materials which is a video to be covered, and attendant information data S3 representing the attendant information is generated on the basis of the data processing operation by a central processing unit (CPU) 24 of microprocessor construction, and is supplied to the composite/transmitting unit 23.

In this embodiment, in the CPU 24, the input attendant information data S4 respectively input from a personal computer 26, a calendar/clock input unit 27, an IC card read unit 28, and a key board 29 which are connected to respective input ports 25A, 25B, 25C, and 25D of data input port part 25 when necessary, is taken to a vertical interval time code (VITC) coding circuit 31 via a bus 30.

Here, a personal computer 26 can input the title, shooting date and time, cameraman, and shooting scene, which have been previously assigned to the news materials shot by the television camera 21 at present, in accordance with the operation of an operator at the shooting scene, while the news materials are shot by the television camera 21.

The calendar/clock input unit 27 automatically inputs shooting date and time data representing the shooting date and time, at the time when the news materials are shot by the television camera 21.

The IC card read out unit 28 stores a previously determined title, cameraman, and shooting scene as card information before a news reporter leaves the broadcasting station STN for the shooting scene. When the news materials are shot by the television camera 21, the operator at the broadcasting scene puts an IC card into the IC card read out unit 28 to input the card information.

The key board 29 can input a title, shooting date and time, cameraman, and shooting scene by an operator at the broadcasting scene when the news materials are shot by the television camera 21.

Thus, the CPU 24 selectively uses one or some of the personal computer 26, the calendar/clock input unit 27, the IC card read out unit 28, and the key board 29 in accordance with the situation of the scene for shooting news materials, and the input information is taken into the bus 30 via the data input port part 25.

Figure 5A:
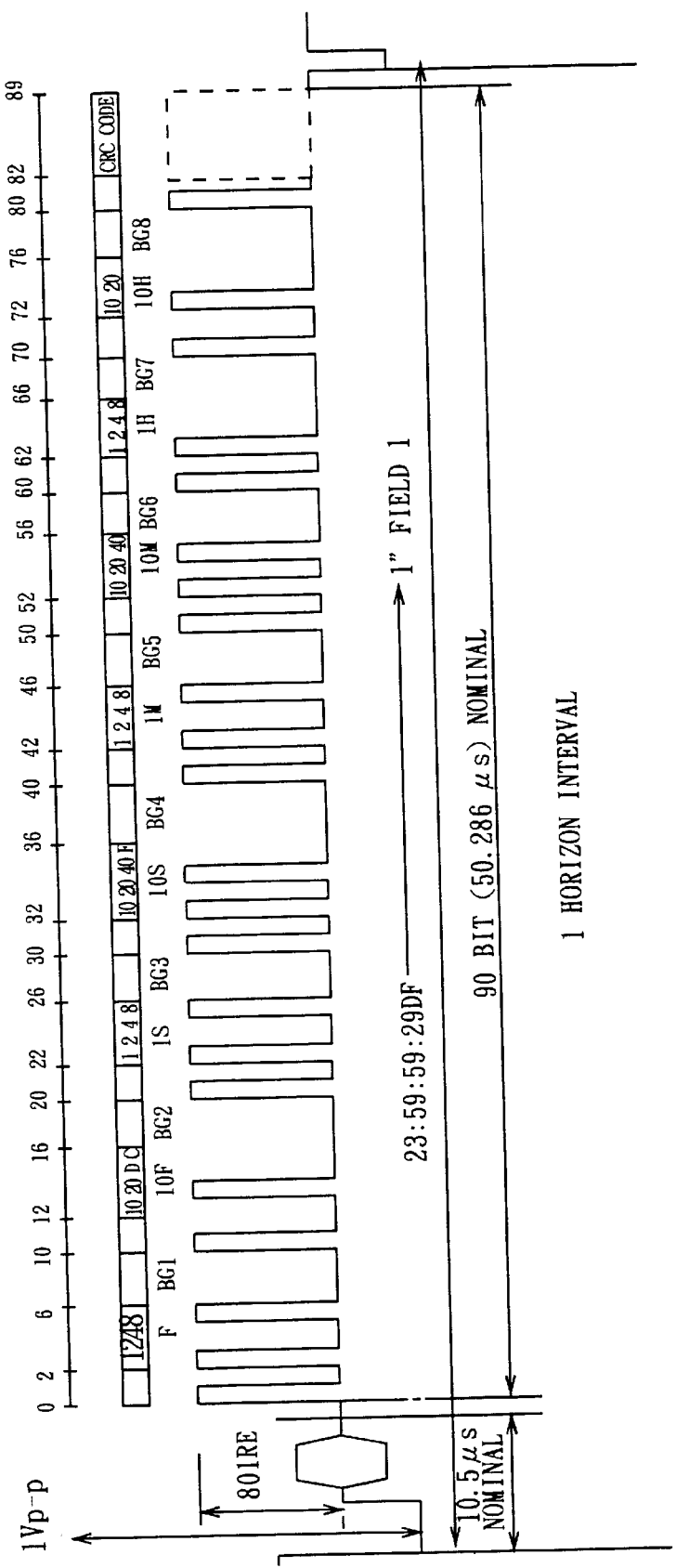
FIG. 5(A) is a schematic diagram showing the contents of VITC code.

As shown in FIG. 5(A), among the data formats prepared as the vertical interval time code (VITC) in 1H interval at 12th and 14th lines and the video signal S1 for one field or one frame being the television signal of NTSC television system obtained from the television camera 21, as shown in FIG. 5(B), the VITC coding circuit 31 operates such that the input attendant information data S4 input via the data input port part 25 is assigned to a 1st to 8th user's bits which are assigned to 6–9 bits, 16–19 bits, . . . , 76–79 bits. Therefore, the attendant information data S3 is supplied to the composite/transmitting unit 23 at a timing of the 1st to 8th user's bits of the material video data S2.

As a result, the composite/transmitting unit 23, using one field or one frame as one block, outputs to the transmission line 12 the transmission video data S5 in which the attendant information data S3 is dispersed and inserted to the 1st to 8th user's bits at the 1H interval in 12th and 14th lines of the vertical blanking intervals.

The transmission video data S5 output from the video data transmitting part 11 to the transmission line 12 is received by the receiving unit 41 (FIG. 3) of the broadcasting station STN and stored in the video data storing unit 42.

In this embodiment, the video data storing unit 42 has a capacity which is sufficient to store the transmission video data S5 for sixteen hours.

Figure 6:
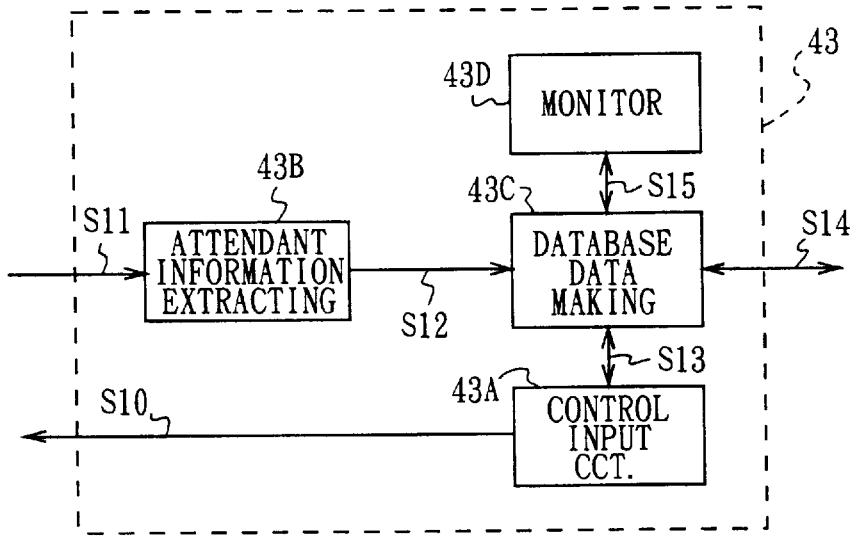
FIG. 6 is a block diagram showing the detail of a database making unit of FIG. 3.

After the transmission video data of each news material is stored in the video data storing unit 42, the stored transmission video data of each news material, in a database making unit 43 shown in FIG. 6, is sequentially read out by read out signal S10 supplied from a database making control input circuit 43A and the read out data S11 is supplied to an attendant information extracting circuit 43B.

The attendant information extracting circuit 43B extracts the attendant information S12, which is assigned to the news materials, from the 1H interval of the 12th and 14th lines of the read out data S11 and supplies it to a database data making circuit 43C.

The database data making circuit 43C makes database data S14 in which address data representing the absolute address on a memory area of the video data storing unit 42 is added to the extracted attendant information S12, sequentially stores it in the database storing unit 44, and supplies display information S15 to display the database data to the monitor 43D.

Thus, the operators at the broadcasting station STN can store the news materials which have been stored in the video data storing unit 42 in the database storing unit 44 as a database, can retrieve one or some of the contents of attendant information such as "title", "shooting data and time", "cameraman", and "shooting scene", while operating the database making control input circuit 43A, and can display the made database data on the monitor 43D.

In this embodiment, the database data making circuit 43C specifies the database data stored in the database storing unit 44, for example, for each news material, or for a desired range, or specifies so as to scroll the memory area of the database storing unit 44, to display the database data on the monitor 43D, thus making it possible to confirm the made database.

The editing operators of a plurality of editing units 45A, 45B, . . . , 45N use the made database for access, so that the video data of each news material stored in the video data storing unit 42 is edited as a television program.

Figure 7:
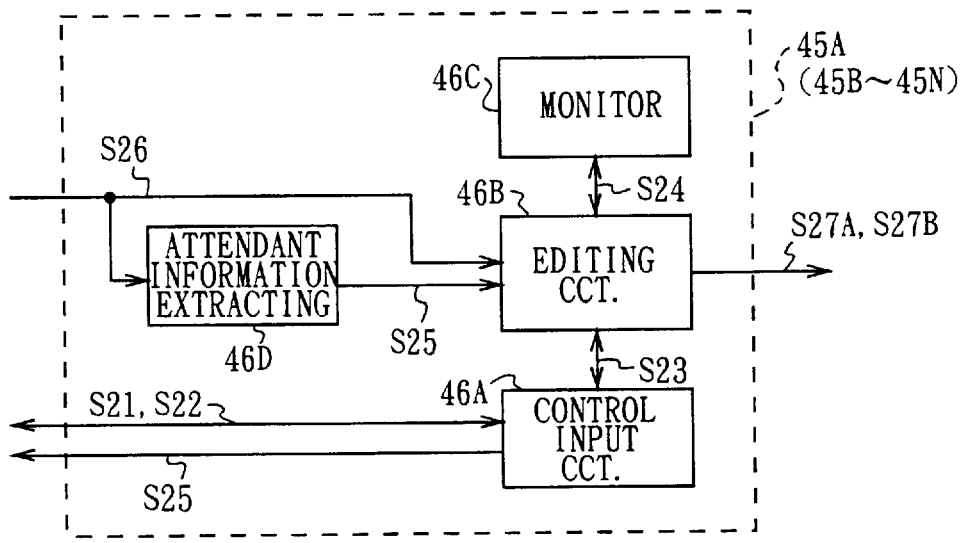
FIG. 7 is a block diagram showing the detailed structure of the editing unit of FIG. 3.

As shown in FIG. 7, the editing operators operate an edit control input circuit 46A so that the editing units 43A to 45N supply the input database read out signal S21 to the database storing unit 44. The database read out signal S21 specifies one or some of the contents of the attendant information corresponding to each news material, of the database data, such as "title", "shooting date and time", "cameraman", and "shooting scene" as a keyword. All of the attendant information including the specified keyword is read out with the address data representing the position where the transmission video data is stored, and transmitted again to the edit control input circuit 46A as response signal S22.

At this time, the edit control input circuit 46A communicates with an editing circuit 46B by communication signal S23 and outputs the display information S24 from the editing circuit 46B to the monitor 46C. Therefore, the contents of response signal S22 from the database storing unit 44 is displayed on a monitor 46C, so as to show the visual editing information for editing operators.

In this way, editing operators can specify the absolute address of news materials to be edited one by one from the edit control input circuit 46A, while referring to the editing information. At this time, the edit control input circuit 46A supplies the video data read out signal S25 to the video data storing unit 42 to transmit the video data stored in the specified absolute address to the editing circuit 46B and to an attendant information extracting circuit 46D as editing material data S26.

The attendant information extracting circuit 46D extracts the attendant information inserted in the transmitted editing material data S26 and supplies it to the editing circuit 46B as attendant information data S25.

At this time, the editing circuit 46B superimposes the extracted attendant information to the video of the transmitted editing material data S26, based on the communication signal S23 supplied by the editing operators from the edit control input circuit 46A, and displays it on the monitor 46C so as to show the contents of news materials for the editing operators visually.

Therefore, the editing operators input the edit command information from the edit control input circuit 46A as the communication signal S23, while looking at the video displayed on the monitor 46C and the attendant information, so as to perform the edit processing such as assembling edit, insertion edit, feed-in edit, feed-out edit, or the like in the editing circuit 46B.

The edited video data edited at the editing units 45A, 45B, . . . , 45N is recorded in the recording unit 47 (FIG. 3) as news program data S27A so as to be arranged in the order of time of broadcasting. The news program data S27A is reproduced from the recording unit 47 at the time of broadcasting and output on the transmission line 49 to the broadcasting antenna through a broadcasting signal output unit 48.

The broadcasting system 10 in this embodiment is so constructed that the edited video data of the editing units 45A, 45B, . . . , 45N is directly supplied to the broadcasting signal output unit 48 as urgency news data S27B, thereby a program of importance can be output rapidly when necessary.

Further, the broadcasting system 10 in this embodiment is so constructed that the transmission video data S5 received from the transmission line 21 is directly supplied to the broadcasting signal output unit 48, thereby it is possible to broadcast an on-the-spot broadcasting program separately from the urgency news data S27B of the editing units 45A, 45B, . . . , 45N or the news broadcasting program data S27A of the recording unit 47.

With the above construction, in the video data transmitting unit 19 which is carried to the shooting scene, when the video of news materials is shot by the television camera 21, the attendant information ("title", "shooting date and time", "cameraman", and "shooting scene") inputted via the respective data input ports 25A to 25D of the data input port part 25 is inserted, at the composite/transmitting unit 23, in the user's bits of the vertical interval time code (VITC) provided at the 12th and 14th lines in the vertical blanking interval for each field or frame of the material video data S2 obtained from the television camera 21 at the VITC coding circuit 31.

Thus, the attendant information data S3 inserted in the material video data S2 is inserted in the vertical blanking interval, so that it is stored in the video data storing unit 42 of the broadcasting station STN as a part of the data stream of news materials without bad influence on the material video data S2.

The transmission video data stored in the video data storing unit 42, because the characteristic attendant information is inserted for each news material, uses the attendant information as a keyword so as to easily and correctly retrieve and take a desired news material from a plurality of news materials having various contents.

As a result, it becomes easy to sort out the news materials in the database making unit 43, so that a database having an appropriate storing form can be constructed in the database storing unit 44.

When retrieving a desired news material from the database storing unit 44 to edit a program in a plurality of editing units 45A, 45B, . . . , 45N, the operators can edit while always confirming the attendant information inserted in each news material, so as to edit a program easily and correctly.

For instance, when the news material of "the press conference of Prime Minister in Apr. 1, 1996" is edited in either of the editing units 45A to 45N, if an editing operator inputs the read out signal S21 specified by using the shooting date and time "Apr. 1, 1996" as a first keyword and the title "Prime Minister" as a second keyword from the edit control input circuit 46A, the address data of all attendant information having the keywords "April 1, 1996" and "Prime Minister" as the shooting date and time and the title respectively is retrieved in the video data storing unit 42. As a result, the read out video data is supplied to the editing units 45A to 45N as editing material data S26.

Therefore, the editing operator uses the attendant information inserted in the video signal in identifying the news material as a keyword to easily retrieve the necessary video from the video data storing unit 42.

With the above construction, in making a news material, the attendant information data is inserted in the data stream of the video data, so that it can be utilized as a sort-out processing means in making database when all video data is transmitted. Therefore, the database can be constructed easily and correctly.

Further, when a plurality of operators respectively edit by the editing units, the operators obtain the attendant information so as to confirm the contents of the video data easily and correctly.

(2) Other Embodiments

The aforesaid embodiment has been used for the case where user's bits of the VITC time code inserting interval provided in vertical blanking intervals are utilized for inserting the attendant information in the video data. However, this invention is not only limited to this, but instead of this as shown in FIG. 8, the attendant information can be inserted by utilizing an ancillary data interval (the word address is 795 to 849 interval) provided in a horizontal synchronizing interval of the NTSC composite digital signal based on the SMPTE 259M standard.

Figure 9:
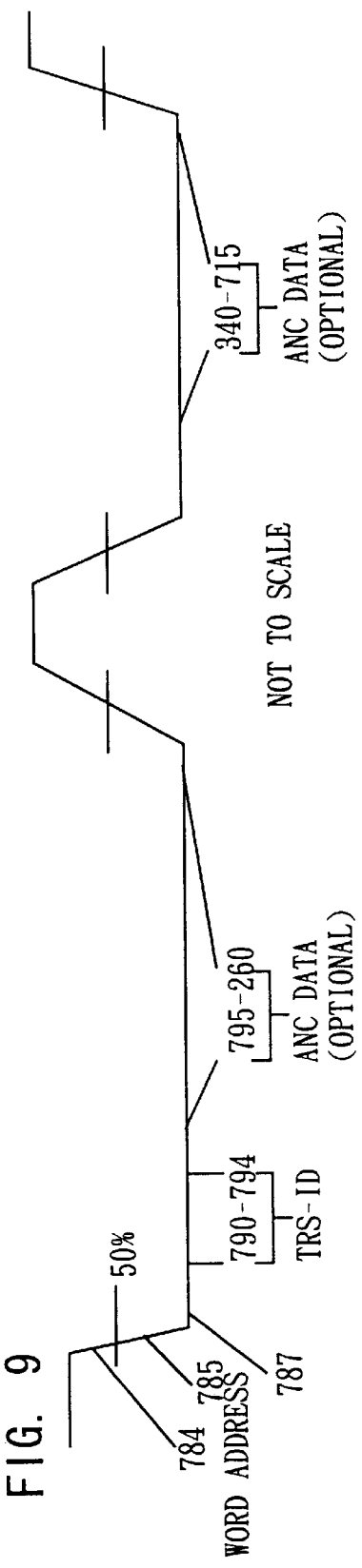
FIG. 9 is a schematic diagram showing a format during an ancillary data interval provided in NTSC vertical synchronizing interval.

In addition to this, or separately from this, as shown in FIG. 9, the attendant information can be inserted in an ancillary data interval (the word address is 795 to 849 interval and 340 to 715 interval) provided in vertical synchronizing intervals.

Figure 8:
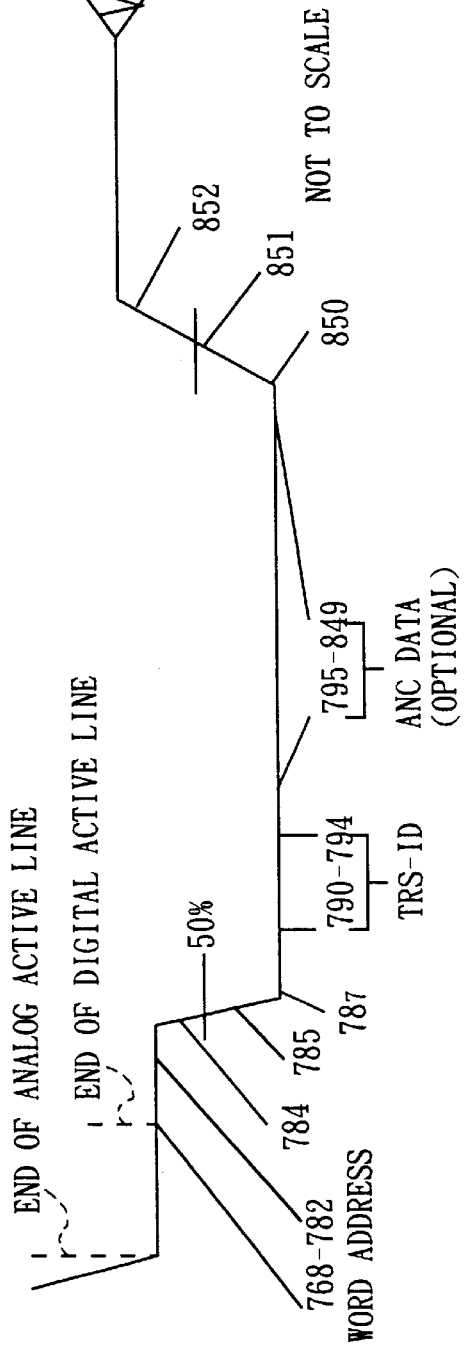
FIG. 8 is a schematic diagram showing a format during an ancillary data interval provided in NTSC composite digital horizontal synchronizing interval of SMPTE 259M standard.
Figures 10A, 10B:
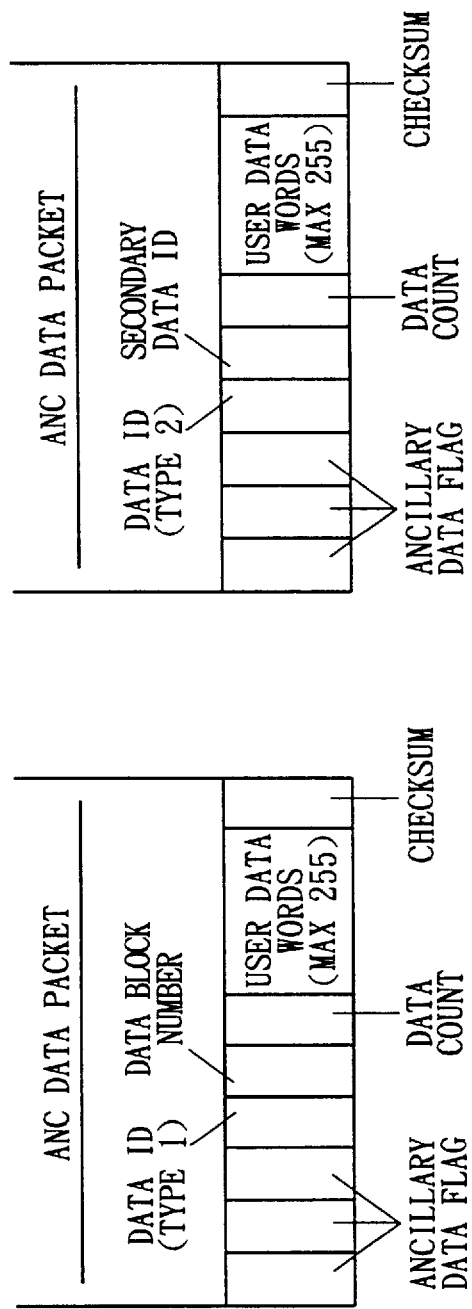
FIGS. 10(A) and 10(B) are schematic diagrams explaining an ancillary data packet used for the ancillary data interval of FIGS. 8 and 9.

In the case of FIGS. 8 and 9, as shown in FIG. 10(A), it is prescribed that a first form of an ancillary packet is formed by user data words and checksum in addition to ancillary data flag, data ID of type 1, data block number, and data count.

Further, as shown in FIG. 10(B), it is prescribed that a second form of an ancillary packet is formed by user data words and checksum in addition to an ancillary data flag, data ID of type 2, secondary data ID, and data count.

If the attendant information is inserted in the user data words of these data packets, the attendant information can be transmitted together with the video data similar to the above embodiment, and a video signal transmitting apparatus capable of making a database and editing easily and surely can be realized.

Further, the aforesaid embodiment has been used for the case where "title", "shooting date and time", "cameraman", and "shooting scene" are specified as an attendant information. However, this invention is not only limited to this, rather a maker code for identifying the maker of shooting unit, a model name of shooting unit such as "mechanic IC", "serial number of machine", "cassette number", and "shot number" for identifying the shot scene, etc. can be used as necessary, and "brief description" can also be used instead of title. The use of such information also can obtain the same effects as the above embodiment.

Further, the aforesaid embodiment has been used for the case where in the video data transmitting part 11 which is carried to the shooting scene, the video signal obtained from the video camera 21 is input to the composite/transmitting unit via the analog-to-digital converting circuit 22 in real time. However, this invention is not only limited to this, rather the video signal S1 of the television camera 21 is once recorded in the recording unit such as a magneto-optical (MO) recording unit and a video tape recorder, thereafter, the video signal S1 can be read out from the recording unit at the time of transmitting the transmission video data S5 from the video data transmitting part 11 and supplied to the composite/transmitting unit 23, so as to insert the attendant information data S3.

Further, the aforesaid embodiment has been used for the case where the attendant information is inserted in all of the news materials before being transmitted to the broadcasting station. However, this invention is not only limited to this, rather when reusing a video of which the news material has been made in the past and stored without the attendant information, the attendant information can be inserted as necessary at the broadcasting station.

Further, the aforesaid embodiment has been used for the case where an operator specifies the attendant information as a keyword when the video data is edited in the editing units 45A to 45N and the video data is read out from the database storing unit 44. However, this invention is not only limited to this, rather the database data stored in the database storing unit 44 is read out as a list to display on the monitor 46C, so as to show it as editing information for the operator.

Furthermore, the aforesaid embodiment has been used for the case where the database data stored in the database storing unit 44 is used to edit the video data stored in the video data storing unit 42 by a plurality of editing units 45A to 45N respectively. However, this invention is not only limited to the case of providing a plurality of editing units, rather the editing by one editing unit can obtain the effects that the video data of the video data storing unit 42 is edited easily and surely by using the attendant information stored in the database storing unit 44.

INDUSTRIAL APPLICABILITY

This invention can be used for a video signal transmitting apparatus which stores and edits the video signal with the attendant information having an important meaning to specify the content of each video.

I claim:

1. A video signal transmitting apparatus for use with a video camera, said apparatus comprising:

a video data transmitting unit for adding attendant information to video data generated by said video camera at a different time area from said video data in order to form transmission video data and for transmitting said transmission video data;

a video data storing unit for receiving and storing said transmission video data formed by said video data transmitting unit;

a database storing unit for extracting said attendant information from said transmission video data and storing in a database said attendant information for use as a keyword; and editing units for editing said transmission video data stored in said video data storing unit using said attendant information stored in said database storing unit as said keyword.

2. The video signal transmitting apparatus as set forth in claim 1, wherein said attendant information is added to said video data in a blanking interval of said video data.

3. The video signal transmitting apparatus as set forth in claim 1, wherein said attendant information comprises at least one of a title, a cameraman identification, a shooting date and time, and a shooting scene.

4. The video signal transmitting apparatus as set forth in claim 1, wherein said editing units include a plurality of editing units for editing said transmission video data stored in said video data storing unit using said attendant information stored in said database storing unit as said keyword.

* * * * *